(12) United States Patent
Ahaus et al.

(10) Patent No.: US 8,894,371 B2
(45) Date of Patent: Nov. 25, 2014

(54) ROTOR SECTION FOR A ROTOR OF A TURBOMACHINE, AND ROTOR BLADE FOR A TURBOMACHINE

(75) Inventors: Guido Ahaus, Essen (DE); Axel Buschmann, Essen (DE); Sascha Dungs, Wesel (DE); Harald Hoell, Wächtersbach (DE); Karsten Kolk, Mülheim a.d. Ruhr (DE); Mirko Milazar, Oberhausen (DE); Peter Schröder, Essen (DE); Vyacheslav Veitsman, Gelsenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 624 days.

(21) Appl. No.: 13/201,877

(22) PCT Filed: Jan. 27, 2010

(86) PCT No.: PCT/EP2010/050934
§ 371 (c)(1),
(2), (4) Date: Oct. 26, 2011

(87) PCT Pub. No.: WO2010/094539
PCT Pub. Date: Aug. 26, 2010

(65) Prior Publication Data
US 2012/0039719 A1 Feb. 16, 2012

(30) Foreign Application Priority Data
Feb. 17, 2009 (EP) .................................... 09002223

(51) Int. Cl.
F04D 29/34 (2006.01)
F01D 5/08 (2006.01)
F01D 5/30 (2006.01)
F01D 5/32 (2006.01)

(52) U.S. Cl.
CPC ............... *F01D 5/081* (2013.01); *Y02T 50/673* (2013.01); *Y02T 50/676* (2013.01); *F01D 5/3015* (2013.01); *F01D 5/326* (2013.01); *F01D 5/323* (2013.01)
USPC ..................................................... 416/220 R

(58) Field of Classification Search
CPC ........... F01D 5/02; F01D 5/025; F01D 5/028; F01D 5/30; F01D 5/3007; F01D 5/3015; F01D 5/3023; F01D 5/303; F01D 5/3038; F01D 5/30369; F01D 5/3076; F01D 5/32; F01D 5/323; F01D 5/326; F01D 5/3053
USPC ..................... 416/96 R, 220 R, 248; 415/115
See application file for complete search history.

(56) References Cited

U.S. PATENT DOCUMENTS 3,076,634 A 2/1963 Boyle
3,501,249 A 3/1970 Zabrodsky
(Continued)

FOREIGN PATENT DOCUMENTS

CN 101220756 A 7/2008
DE 1963364 7/1970
(Continued)

*Primary Examiner* — Edward Look
*Assistant Examiner* — William Grigos

(57) ABSTRACT

A rotor section for a rotor of a gas turbine, a rotor blade, and a blocking element are provided. The rotor section includes a rotor disk including rotor blades that are inserted thereon in holding grooves and that are secured against sliding along the holding grooves by means of a sealing element arranged at the end face. In order to specify a reliable, simple, and easy-to-design construction for the circumferential fixing of the sealing elements, it is proposed that each sealing element be secured by one blocking element, which engages in a hole arranged at the end face in the rotor blade root.

7 Claims, 2 Drawing Sheets

(56) References Cited

U.S. PATENT DOCUMENTS

| | | | |
|---|---|---|---|
| 3,572,966 A | 3/1971 | Borden et al. | |
| 3,720,480 A | 3/1973 | Plowman et al. | |
| 3,748,060 A | 7/1973 | Hugoson et al. | |
| 3,853,425 A * | 12/1974 | Scalzo et al. | 416/95 |
| 2008/0253895 A1* | 10/2008 | Gekht et al. | 416/220 R |
| 2009/0148298 A1* | 6/2009 | Strohl et al. | 416/219 R |
| 2011/0163506 A1* | 7/2011 | Hafner | 277/309 |
| 2011/0176923 A1* | 7/2011 | Haffner | 416/220 R |

FOREIGN PATENT DOCUMENTS

| | | | |
|---|---|---|---|
| DE | 1963364 A1 | 7/1970 | |
| DE | 3033768 A1 | 4/1981 | |
| DE | 19757188 A1 | 6/1999 | |
| EP | 0086691 A1 | 8/1983 | |
| EP | 86691 A1 * | 8/1983 | F16B 21/04 |
| EP | 1114937 A1 | 7/2001 | |
| EP | 1389669 A1 | 2/2004 | |
| EP | 1114937 B1 | 6/2006 | |
| EP | 1944471 A1 | 7/2008 | |
| EP | 1944472 A1 | 7/2008 | |
| EP | 1978211 A1 | 10/2008 | |
| FR | 2524933 | 10/1983 | |
| FR | 2524933 A1 | 10/1983 | |
| JP | 46011683 B1 | 3/1971 | |
| JP | 46011683 Y1 | 4/1971 | |
| JP | 58035203 A | 3/1983 | |
| JP | 2008169838 A | 7/2008 | |
| RU | 1077380 C | 6/1995 | |
| RU | 62165 U1 | 3/2007 | |
| SU | 1714170 A1 | 2/1992 | |

* cited by examiner

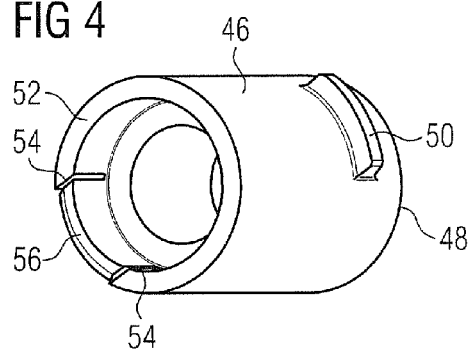
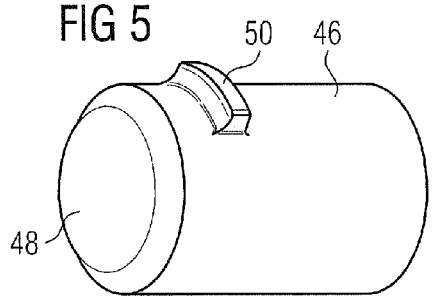
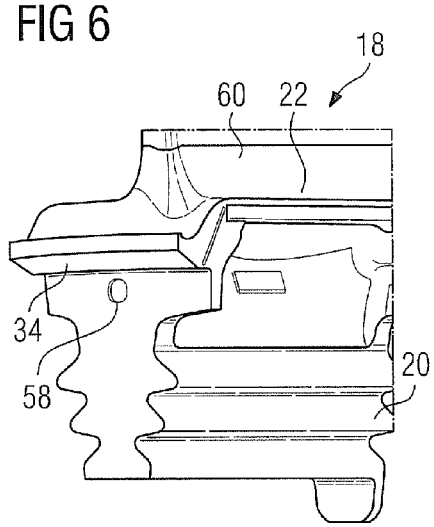
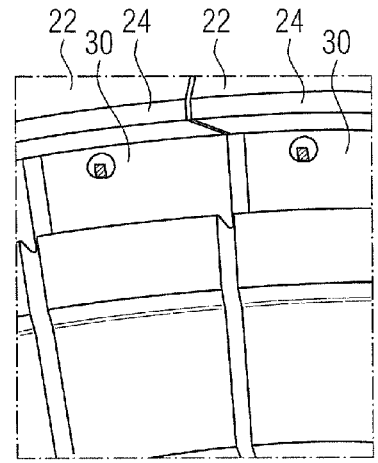
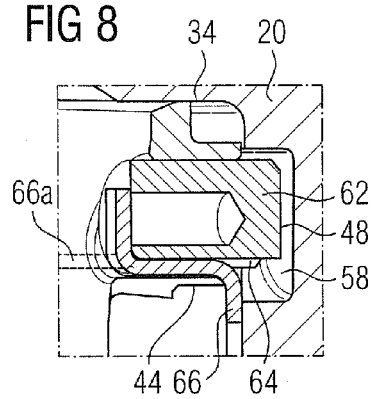
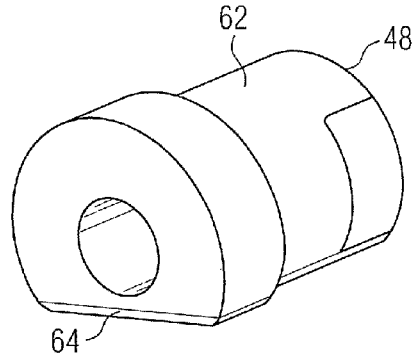

US 8,894,371 B2

ROTOR SECTION FOR A ROTOR OF A TURBOMACHINE, AND ROTOR BLADE FOR A TURBOMACHINE

CROSS REFERENCE TO RELATED APPLICATIONS

This application is the US National Stage of International Application No. PCT/EP2010/050934, filed Jan. 27, 2010 and claims the benefit thereof. The International Application claims the benefits of European Patent Office application No. 09002223.7 EP filed Feb. 17, 2009. All of the applications are incorporated by reference herein in their entirety.

FIELD OF INVENTION

The invention refers to a rotor section according to the preamble of the claims. The invention furthermore refers to a rotor blade according to the preamble of the claims.

BACKGROUND OF INVENTION

An axial rotor section according to generic type for a turbine or a turbine rotor is known from laid open specification DE 1 963 364, for example. The rotor section, which comprises a rotor disk, has on its outer periphery a plurality of axially extending retaining grooves for rotor blades of the turbine. On the rotor disk, on the end face, provision is made in this case for an endlessly encompassing locating slot for sealing strips. On one side wall of the locating slot, provision is made for a plurality of projections which are evenly distributed in the circumferential direction and partially overlap the base of the locating slot. Seated in the locating slot are plate-like sealing strips which on their radially inwardly disposed inner edge have a thickened portion on both sides, the width of which corresponds approximately to the width of the locating slot. The thickened portion, as seen in the circumferential direction, in this case is sectionally interrupted by recesses which are of a broad design corresponding to the projections of the locating slot. As a result of this, the sealing strip can be inserted in the locating slot by means of a purely radial movement from the outside and after a displacement in the circumferential direction—the displacement travel of which corresponds approximately to the width of the projection—is hooked into this. The thickened portion of the sealing strip then fits behind the projections of the locating slot so that the sealing strip cannot move outwards. For installing all the sealing strips, these are to be inserted successively in the locating slot and only then are to be collectively displaced in the circumferential direction. As a result of this, the necessity of a sealing strip lock is avoided. After inserting the sealing strips and the rotor blades, the outer edges of the sealing strips are inserted in platform-side grooves in the rotor blades so that the last-named are secured against axial displacement. For finishing the installation, the sealing strips are fixed in their raised position by means of a screw. Each widened portion then bears against the projection. By means of this arrangement of the components, a first space which lies between the sealing strip and the end face of the rotor disk can be separated and sealed in relation to a second space, which lies on the other side of the sealing strip, for the guiding of various media. For achieving a particularly satisfactory seal, the sealing strip bears by its widened portion against that sidewall of the locating slot on which there is no provision for a projection. Moreover, an inner, conically extending edge of the projection ensures that the sealing strip is pressed onto the projection-less sidewall of the locating slot by influence of centrifugal force.

One disadvantage of the known arrangement is the costly construction of the side surfaces of the rotor disk and of the sealing strip with projections and recesses. A further disadvantage is the use of a screw for securing the sealing strip against displacement in the circumferential direction. On account of the alternating thermal stress which occurs between operation and stationary state and on account of the hot gas which flows through the turbine, problems relating to corrosion and strength in the screw fastening can occur. These possibly cannot be resolved in a specified manner. In this case, the screw is drilled out, wherein this process is carried out as a rule on the rotor which still lies in the lower casing half of the gas turbine. It can happen that swarf falls into the lower casing half in the process, which can bring about undesirable contaminations during subsequent operation.

Also, a security for rotor blades against axial displacement, which rotor blades are retained by means of a plate which is displaceable in the circumferential direction, is known from FR 2 524 933. The arrangement which is shown therein, however, is not suitable for sealing a space close to the disk in relation to a space which exists on the other side of the plate.

Furthermore, a rotor sub-assembly of a turbine, which has a one-piece sealing ring for the axial locking of rotor blades, is known from laid open specification DE 30 33 768 A1. The one-piece sealing ring of DE 30 33 768 A1 is hooked into the turbine disk in the manner of a bayonet connection. To this end, projections and recesses are arranged alternately both on the turbine disk and on the sealing ring in a distributed manner along the circumference. For installation, the sealing ring is located on the rotor disk, wherein the recesses and projections lie opposite each other. By means of a slight rotation of both parts, these can then be mutually hooked into each other. On account of the integral constructional form of the sealing ring, this, however, can only be used in aircraft gas turbines since their turbines are assembled by stacking in the axial direction. Stationary gas turbines, on the other hand, are assembled from two casing halves which encompass the completely installed rotor.

SUMMARY OF INVENTION

The object of the invention is therefore the provision of an axial rotor section for a stationary gas turbine and the provision of a rotor blade of a turbine, which is further improved with regard to the installation and removal of sealing elements.

The object which is directed towards the rotor section is achieved by means of a rotor section according to generic type with the features of the claims. Furthermore, the object which is directly towards the rotor blade is achieved with a rotor blade according to the claims.

The invention is based on the knowledge that a particularly reliable securing of the sealing elements is especially possible when the location at which the sealing elements are supported against the rotor by centrifugal force and that location at which the individual sealing elements are secured against displacement in the circumferential direction, lie as close as possible to each other. In other words, the distance which exists in the radial direction of the rotor between that surface of the rotor against which the sealing element bears by centrifugal force and the location of the security of the sealing element against circumferential displacement should be as small as possible. This means that sealing elements which bear against a contact surface of a rotor blade should also be secured on their outer region against displacement in the circumferential direction. In order to disclose a construction which is as simple as possible for a circumferential locking in this case, provision is made for a bolt-like blocking element. On one side, the blocking element fits in an opening which is provided in the sealing element. On the other side, the bolt-like blocking element fits in a hole which is arranged in the end face of a rotor blade root. The opening in the sealing element in this case is comparatively close to that edge of the sealing element which bears against the contact surface of the rotor. The contact surface can preferably be a part of an underside of a platform of the rotor blade. On account of the sealing element bearing firmly against the contact surface by centrifugal force action, only negligible, if any, relative movements occur between sealing element and rotor blade root. The circumferential fixing of the sealing element is therefore carried out on that component against which the sealing element is supported during operation and which therefore has an influence upon the position and movement of the sealing element. By means of such an arrangement, wear on the contact surface, on the sealing element and on the blocking element can be reliably avoided.

The radial positioning of the blocking element with regard to the rotor was subsequently selected so that its position is located in a region which is movement-neutral relative to the rotor blade so that compensation of the operation-induced movements in the fixing point of the blocking element is not necessary. By using a bolt-like blocking element, flexibility of the fixing can be prevented.

A cooling medium, which is provided for cooling the rotor disk and the rotor blade, is guided on the rotor section between sealing element and end face of the rotor disk. The arrangement which is proposed by the invention leads to the minimization of leakages of cooling medium since by the use of a round opening in the sealing element and use of the blocking bolt which is inserted therein without clearance, a comparatively short leakage section, or a leakage area of small dimension, is achieved. By reducing the amount of cooling medium which is lost as leakage, an effiency increase of the turbine can be achieved in principle.

On a rotor blade according to the invention, which comprises at least a blade root, a platform and a curved blade airfoil, provision is made for a projection which protrudes over the blade root, wherein on the underside of the projection which faces the blade root, provision is made for a contact surface, which faces the blade root, for the plate-like sealing element. In order to achieve a comparatively small distance between the contact surface for the sealing element and a device for locking the sealing element against movement in the circumferential direction, provision is made for a blind hole for accommodating the blocking element in the end face of the blade root, which hole is located directly adjacent to the projection. With this, advantages similar to the rotor section can be achieved.

The opening in the sealing element is of a keyhole-like design and the blocking element is of a bolt-like design with a cam arranged on its outer circumference. By means of the keyhole-like opening, the bolt together with the cam can be inserted through the opening of the sealing element, after which the blocking element is rotated around its longitudinal axis in order to rotate the cam into a gap between the blade root and the sealing element without clearance.

In order to achieve a clearance-free fastening of the sealing element, the bolt-like blocking element has a cam on its outer circumference. The cam fits without clearance between sidewalls—which lie directly opposite one another—of the sealing element and of the rotor blade root. As a result of this, hammering wear on the outer sealing element edge can be avoided.

Advantageous developments are disclosed in the dependent claims.

The hole is arranged preferably close to, i.e. as seen radially, and directly beneath the contact surface. Corresponding to this, the opening of the sealing element, in which the bolt for locking also fits, is also arranged comparatively close to that edge of the sealing element which bears against the contact surface of the rotor blade.

Particularly as a result of this, a positioning of the bolt-like blocking element in a neutral region relative to the rotor blade movement ensues.

In order to secure the blocking element itself against rotation and therefore against loss from the rotor section, this has a crenellation on the end face which can be bent into a bit recess of the keyhole-like opening Created as a result of this is a form-fit between crenellation and bit recess which after bending of the crenellation reliably secures the blocking element against an unwanted rotation inside the hole and inside the opening. An unintentional loss of the blocking element can therefore be avoided.

The crenellation is preferably part of an end-face ring of the blocking element, as a result of which this can be produced comparatively simply and inexpensively. In order to finally produce the crenellation, provision is made in the encompassing rings for two slots, between which the crenellation is arranged.

In an alternative advantageous development of the invention, the blocking element can be secured against loss by means of a Z-shaped sheet metal strip. To this end, the blocking element is flattened along its longitudinal extent. The sheet metal strip, which is still in the shape of an L before installation, is inserted through the opening for this purpose and by its angled leg is placed between sealing element and rotor blade root, after which the bolt-like flattened blocking element is consequently inserted into the opening and blind hole. The previously L-shaped sheet metal strip is then brought into its Z-shape by bending round, wherein this then secures the blocking element against loss.

A particularly simple removal of the blocking element is achieved if—after the security against loss of the blocking element has been removed—the blocking element has an end-face opening for its removal. In the opening, provision can be made for a thread, for example, in which a means for withdrawing the blocking element from the opening and hole can be screwed. This feature enables a particularly simple and quick removal of the blocking element.

All the sealing elements, bearing against each other in the circumferential direction, preferably form a sealing ring so that a cooling medium can flow along between sealing ring and end face of the blade root or end face of the rotor disk almost without loss. The sealing elements in this case can also slightly overlap.

As a result of this, a particularly efficient guiding of cooling medium along the end face of the blade root or blade disk can be enabled.

If the hole is formed as a blind hole, this can be produced comparatively simply.

According to a further development, the contact surface on the underside of the projection of the rotor blade is formed at least partially as the base of a slot which is open towards the blade root. This prevents slipping of the sealing element in the axial direction of the turbine rotor.

Overall, with the invention a construction which can be designed in a straightforward and simple manner for the circumferential fixing of sealing elements is disclosed, wherein each sealing element is preferably secured by means of a blocking element in each case. The blocking element, with correspondingly manufactured cam, can be inserted like a key into a matching hole in the sealing element and after reaching the axial end position can be rotated by 180° so that the cam secures the axial fixing of the blocking bolt (key principle). In so doing, the blocking element projects by its corresponding end into the correspondingly dimensioned hole in the associated rotor blade root so that displacement of the sealing element in the circumferential direction is prevented. Securing the blocking bolt against unwanted rotation and disengagement from the opening and from the blind hole is carried out by means of a corresponding deformation of the crenellation, which is arranged on the end face on the bolt, into the bit recess—which is required on account of the cam—of the opening so that rotation of the fixing bolt can be excluded. For removal, the crenellation is to be levered out of the bit recess by the use of a suitable driver tool. The blocking element can then be rotated by 180° and withdrawn.

The construction which is described by the invention has high robustness in this case since this can be constructed so that even with conservative consideration for the boundary conditions the full circumferential forces of the sealing elements can be reliably transferred. Flexibility of the fixing is not necessary. Moreover, no expensively produced slots/pockets for accommodating a bent-in locking plate are necessary, as a result of which the arrangement is comparatively inexpensive.

BRIEF DESCRIPTION OF THE DRAWINGS

Further advantages and further features result from the subsequent figure description. In the drawings:

FIGS. 4, 5 show the blocking element in perspective views, FIG. 6 shows the perspective view of a part of a rotor blade for a turbomachine, FIG. 7 shows the plan view of a rotor arrangement according to an alternative development, FIG. 8 shows the alternative development of securing a blocking element against axial displacement and FIG. 9 shows a further blocking element in perspective view.

DETAILED DESCRIPTION OF INVENTION

Figure 1:
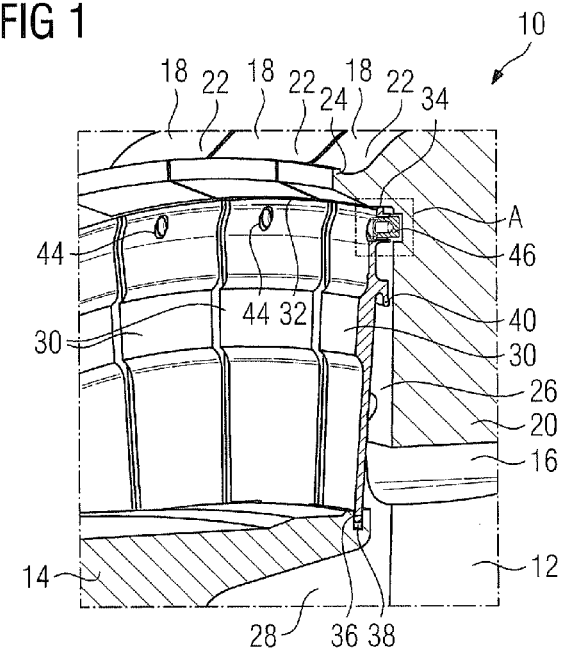
FIG. 1 shows a partially perspective sectional view of a rotor section.

FIG. 1 shows in partially perspective, partially sectioned view a rotor section 10 for the rotor of a turbomachine, which is not additionally shown, which can be designed as a gas turbine. The rotor section essentially comprises on the one hand a first rotor disk 12 and a further rotor disk 14 which is adjacent thereto. The rotor disks 12, 14 are interconnected in a form-fitting manner by means of a Hirth toothing, which is not shown, for the transmission of torque, and are clamped to each other via a tension bolt, which is not additionally shown. The rotor section 10, alternatively to the depicted representation, could also be formed from a single piece in the form of a monoblock or from a singe rotor disk. On the outer periphery of the rotor section 10, provision is made for a plurality of rotor blade retaining grooves 16 which in each case extend at least partially in the axial direction of the rotor and of which only one is shown in section. The rotor blade retaining groove 16 has a fir tree-shaped contour. Inserted into the rotor blade retaining grooves 16 is a rotor blade 18 in each case, of which that shown furthest on the right in FIG. 1 is to be seen in section. The rotor blade 18 comprises a blade root 20 which is formed to at least partially correspond to the contour of the rotor blade retaining groove 16 in order to be retained by this in a form-fitting manner in the radial direction. The rotor blade 18 comprises a platform 22 on which is arranged a blade airfoil, which is not additionally shown. The platform 22, according to the section according to FIG. 1, has an inwardly curved outer contour, on the end of which provision is made for an outwardly projecting seal point 24. In this respect, the platform 22 which is shown in FIG. 1 also forms a sealing wing, which in the prior art is known as an "angel wing", which projects over the end face 26 of the blade root 20.

One end face 26 of the blade root 20 aligns with an end face 28 of the rotor disk 12. For each rotor blade, provision is made in each case for a sealing element 30 on the rotor disk 12 on the end face. By centrifugal force action, the sealing elements 30 by their outer edge 32 bear against a contact surface 34, which contact surface 34 is arranged on the underside of the platform 22 or of the projection which protrudes over the blade root 20 on the end face. The contact surface 34 accordingly points inwards. The contact surface 34 could alternatively also be formed as the base of a groove which is arranged on the underside of the platform. The sealing elements 30 are of a strip-like or plate-like design and furthermore comprise an inner edge 36 which fits in an outwardly open annular groove 38.

The sealing elements 30 in this case have an inwardly oriented hook 40 in their outer third on the surface facing the rotor disk 12, which hook, in a way not shown, engages with a hook which is arranged on the rotor disk 12 on the end face 28. As a result of the hooking of the sealing elements 30 into the rotor disk 12, displacement of the rotor blades 18 along the rotor blade retaining groove 16 is reliably avoided so that the sealing elements 30 bring about the axial locking of the relevant rotor blade 18 in each case. Also, the sealing elements 30 serve for guiding a cooling medium, preferably cooling air, along the end face 28 of the rotor disk 12 and end face 26 of the blade root 20.

In order to prevent displacement of the sealing elements 30 in the circumferential direction, provision is made in the region of the outer edge 32 of the sealing elements 30 for an opening 44 in each case. The opening 44, a blocking element 46 which fits therein, and a part of the blade root 20, are shown in detail in FIG. 2. FIG. 3 shows the opening 44 in a perspective view. The opening 44 is of a keyhole-like design with a circular opening section, adjoining which, towards the bottom in FIG. 3, is a comparatively short and a comparatively wide bit recess 47.

The blocking element 46 which is shown perspectively in FIG. 4 and in FIG. 5 has a cam 50 on its outer circumference. The cam 50 is provided rather on the end side, i.e. on an end-face first end 48 of the blocking element 46 and extends along the circumference over an angular length of about 20°. The angular length of the cam 50 corresponds in this case to the width of the bit recess 47 so that the blocking element 46 can be inserted through the opening 44 into the sealing element 30. The blocking element 46, moreover, on its second end-face end has a ring 52 in which two slots 54 are provided so that a part of the ring 52 is foamed as a crenellation 56 or tooth. The slots 54 in this case are arranged on that part of the circumference which lies opposite the ends of the cam 50. In this respect, the crenellation 56 and the cam are at least approximately of equal width. The free end of the crenellation 56 is constructed with a point in this case in order to simplify removal.

Figure 2:
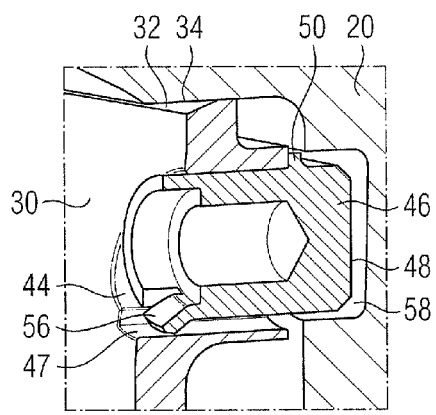
FIG. 2 shows the detail A according to FIG. 1 in detail.
Figure 3:
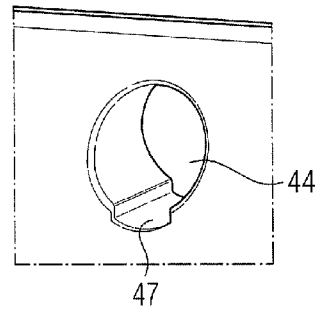
FIG. 3 shows an opening arranged in the sealing element for accommodating a blocking element.

The blocking element 46 is shown in its end position in FIG. 2. For installing the blocking element 46 in the opening 44, the blocking element is to be oriented so that the cam 50 can be inserted through the bit recess 47. After inserting the blocking element 46 in the opening 44, this is rotated around its longitudinal axis by 180° until the crenellation 56 which is arranged on its second end is in the region of the bit recess 47. Using a suitable tool, the crenellation 56 can be bent into the bit recess 47 so that the blocking element 46 is secured against rotation as a result. After inserting the blocking element 46, its end 48 provided with the cam 50 projects into a hole 58 which is arranged on the end face 26 of the blade root 20. The hole 58 in this case is formed as a blind hole in which the end 48 of the blocking element 46 fits with clearance.

The cam 50 correspondingly engages in an axial gap which exists between the end face 26 of the blade root 20 and the sealing element 30. To this end, the sealing element 30 is of a sleeve-like design in the region of the opening 44.

For removal of the rotor blade 18, the crenellation 56 is bent up, as a result of which the form-fit with the bit recess 47 is released. After this, the blocking element 46 can be rotated by 180° so that the cam 50 is located in the region of the bit recess 47. With a suitable tool, the blocking element 46 can then be removed from the opening 44, after which the sealing element 30 can then be displaced in the circumferential direction. As a result of displacing the sealing element 30 in the circumferential direction, the hooking of the sealing element into the rotor disk can be released, therefore the sealing element can be removed from the rotor section 10. The rotor blade 18 can then be removed from the rotor section 10 by axial displacement along the retaining groove 16.

The blind hole 58 which is arranged in the rotor blade root 20 is arranged comparatively close to the contact surface 34 in this case.

FIG. 6 shows the turbine blade 18 in a perspective view, wherein the blade airfoil 60 of the turbine blade 18 is shown only close to the platform, however. Clearly emerging from FIG. 6 is the fact that the blind hole is arranged comparatively close, i.e. directly adjacent, to the contact surface 34. Therefore, the contact surface 34 for the sealing element 30 and its means for preventing movement in the circumferential direction are arranged comparatively close to one another. As a result of the local proximity of both functional means, a particularly secure and reliable displacement blocking can be disclosed, which, moreover, is particularly free of wear since almost no rubbing relative movements arise.

FIG. 7 shows the sealing elements 30, adjacent to each other in the circumferential direction, which before their locking by means of the blocking element are movable in relation to each other in order to enable the installation of a sealing ring which is closed per se. To this end, the edges of the sealing elements which point towards an adjacent sealing element, have in each case only half the material thickness of the sealing element wall so that the sealing elements are formed with overlapping effect in these regions. Instead of a simple overlapping, provision may also be made for tongue-in-groove overlapping.

The alternative development of the circumferential locking which is shown in FIG. 7 differs from that shown in FIGS. 1 to 6 with regard to the additional blocking element 62 and its security against loss from the opening 44 and from the hole 58. The additional blocking element 62 which is shown in FIG. 7 is shown perspectively in FIG. 9. The additional blocking element 62 according to the alternative development is also of a bolt-like design with two different diameters. Along its longitudinal extent, the blocking element 62, however, is formed with a flattened section so that a locking plate can bear against the flat 64. The securing of the blocking element 62 is shown in FIG. 8, wherein FIG. 8 shows the same detail as the detail A which is shown in FIG. 2. Also in this case, identical components are provided with the same designations. After installing the rotor blade 18 in the retaining groove 16 and the subsequent installing of the sealing element 30, an initially L-shaped locking plate 66*a* is inserted into the opening 44, the shorter leg of which engages in a gap between the end face 26 of the blade root 20 and sealing element 30. The blocking element 62 is then positioned on the locking plate 66 by its flat 64. After this, the blocking element 62 is inserted into the opening 44 until it engages by its end 48 in the blind hole 58. Therefore, with a suitable means the previously L-shaped locking plate 66*a*, as seen in cross section, is bent round so that this is Z-shaped in cross section. As a result of the Z-shape of the locking plate 66, this blocks an axial displacement of the blocking element 62. As a result of this, the locking of the sealing element 30 in the circumferential direction cannot be inadvertently released.

Overall, the invention refers to a rotor section 10 for a rotor of a gas turbine, to a rotor blade 18 and to a blocking element 46, 62. The rotor section 10 comprises a rotor disk 12 with rotor blades 18 inserted in retaining grooves 16 thereupon, the rotor blades being secured against displacement along the retaining grooves 16 by means of a sealing element 30 which is arranged on the end face. In order to disclose a reliable construction which can be designed in a straightforward and simple manner for the circumferential fixing of the sealing element 30, the invention proposes that each sealing element 30 is secured by means of a blocking element 46, 62 in each case which in this case engages in a hole 58 which is arranged in the rotor blade root 20 on the end face.

The invention claimed is:

1. A rotor section for the rotor of a turbomachine, comprising:
   a plurality of rotor blade retaining grooves disposed on an outer periphery of the rotor which extend in an axial direction of the rotor and in which a rotor blade is arranged in each case, the rotor blade including a blade root which corresponds to the rotor blade retaining groove;
   a plurality of radially inwardly pointing contact surfaces which are provided in each case on the rotor blades; and
   a plurality of plate-like sealing elements, wherein for the guiding of a cooling medium along a rotor surface on an end face, the plurality of plate-like sealing elements bear against the contact surface by centrifugal force action, wherein for securing the plurality of sealing elements against displacement in a circumferential direction at least one of the plurality of sealing elements includes an opening provided in the sealing element for accommodating a blocking element, wherein provision is made for a hole, which aligns with the opening, and for a positionally secured blocking element, which fits in the hole and in the opening, wherein the hole is arranged in the blade root, and in that the opening is of a keyhole-like design, and
   wherein the blocking element is of a bolt-like design including a cam which is arranged on an outer circumference of the blocking element, which cam may be rotated between the blade root and the sealing element.

2. The rotor section as claimed in claim 1, wherein the hole is arranged in each case closer to the radially inwardly pointing contact surface and the opening is arranged closer to an edge of the sealing element which bears against the contact surface of the rotor blade than to an inner edge of the sealing element.

3. The rotor section as claimed in claim 1, wherein the blocking element includes a crenellation on the end face, which may be bent into a bit recess of the keyhole-like opening.

4. The rotor section as claimed in claim 3, wherein the crenellation is part of an end-face ring of the blocking element.

5. The rotor section as claimed in claim 1, wherein which the blocking element is secured against loss by means of a Z-shaped locking plate, a first end of which lies between the sealing element and a further end face of the blade root.

6. The rotor section as claimed in claim 1, wherein the blocking element includes an end-face opening for its removal.

7. The rotor section as claimed in claim 1, wherein the plurality of sealing elements, bearing against each other in the circumferential direction, form a sealing ring which fits in an annular groove, which annular groove is provided on a circumferential surface which is arranged on an end-face side surface of the rotor.

\* \* \* \* \*